June 18, 1946.  M. HATTAN  2,402,159

SELF-LOCKING NUT

Filed Oct. 14, 1944

INVENTOR.
MARK HATTAN
BY Joseph Ch. Hegell
Chas Koontz
ATTORNEYS

Patented June 18, 1946

2,402,159

UNITED STATES PATENT OFFICE 2,402,159

SELF-LOCKING NUT

Mark Hattan, Dayton, Ohio

Application October 14, 1944, Serial No. 558,707

3 Claims. (Cl. 151—21)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to lock nuts, and among other objects, aims to provide a constant torque self-locking nut of the type disclosed in my pending application Serial No. 522,081 filed February 12, 1944, entitled "Self-locking nut." The object of the invention is to provide an improved type of coiled wire for the thread and nut-locking means of the lock nut. In accordance with the invention, the resilient spirally coiled wire in the nut casing has waves or deformations which extend radially inwardly or at right angles to the axis of the spiral, and which are adapted to be flattened when the lock nut is screwed on a stud or bolt, thereby to lock the lock nut in any position.

The above and other objects and advantages will be understood after referring to the following detailed description of a preferred embodiment of the invention, taken in connection with the accompanying drawing, in which.

Figure 1:
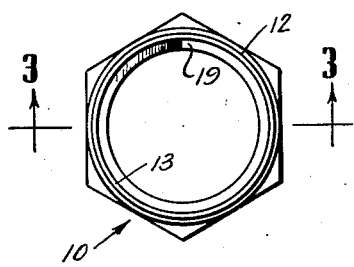
Fig. 1 is a top plan view of the nut body per se.
Figure 2:
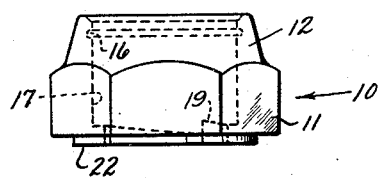
Fig. 2 is a side elevation of the same.
Figure 3:
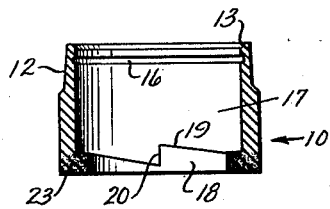
Fig. 3 is a half section of the same on line 3—3 of Fig. 1.

Referring particularly to the drawing, the preferred form of self-locking nut comprises a casing, shell or body 10 whose exterior side walls may be formed into a hexagon 11 for a portion of the length of the nut and may have a plain, slightly frusto-conical portion 12 for the remainder of the length. The circular edge 13 of the frusto-conical portion is preferably chamfered and is adapted to be turned in by a spinning operation to form an annular end abutment or locking flange 14 for holding the coiled locking spring 15 after its insertion into the nut body. To facilitate the spinning, a groove 16 is cut in the inner walls 17 of the nut casing. The spring 15, which also provides a thread for the nut, snugly fits within the smooth, cylindrical walls 17. At its bottom, the nut casing has an annular flange or shoulder 18 of uniform width but preferably formed on its upper surface 19 with a forming tool to provide a uniformly helical abutment for the end of the coiled locking spring. The helical surface 19 is of substantially the same dimensions and pitch as the locking spring and provides a stop or abutment 20 parallel to the axis of the nut, against which one extremity 24 of the coil spring 15 may press, under certain conditions. It will be clear that the locking spring is permanently secured within the body of the nut by the two abutments 14 and 18. While applying this illustrated form of locknut the lower end 24 of the spring 15 will ride up on the helical surface 19 and, due to the resulting camming action, will cause locking of the upper beveled end of the spring against the upper flange 14. The spacing of these two abutments is sufficient to allow a little play or helical creeping of the coil spring within the casing. During the formation of the shoulder 18, e. g. by cold pressing, an annular seat 22 is formed, said seat being shown projecting from the nut, although it need not do so. Cold pressing greatly increases the strength of the nut in the zone where the greatest stresses occur, and much higher loads may be imposed without failure. This zone of increased strength is indicated by the stippling 23 in Fig. 4.

Figure 4:
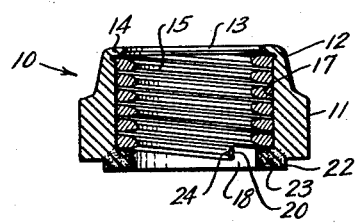
Fig. 4 is a half section of the nut body with the locking spring in normal position.
Figure 6:
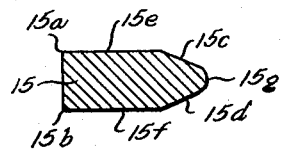
Fig. 6 is an enlarged cross section through the locking spring.

The locking spring may be formed from stainless steel, spring carbon steel, or phosphor bronze wire, preferably music wire, and preferably has a minimum of six convolutions, greater strength however being obtained when eight convolutions are used as shown in Fig. 4. The wire is wound as tightly as possible, with no gaps, and its lower extremity is preferably rounded, as at 24, while its upper end is preferably ground off at right angles to the axis of the coil. However the upper end need not be ground and the upper extremity of the wire may be like the lower extremity 24. The wire previous to coiling is formed as shown in Fig. 6 by drawing it through a die or rollers; this cold drawing increases the tensile strength of the wire to about 395,000 p. s. i. Referring to Fig. 6, the wire 15 has two substantially square corners 15a, 15b, and a pair of converging or beveled faces 15c, 15d at an angle of 150° to the faces 15e, 15f, respectively. Joining the beveled faces is a narrow, slightly convex face 15g. In cross section the wire may be described as an oblong to one of the shorter sides of which a trapezoid is attached. If preferred, the beveled faces may be rolled to a point. The form of faces 15c, 15d, and 15g is such that the spring forms a standard thread (except for slight deformations to be described) for engagement with standard threads on bolts. The center line of each wire section is preferably square with the axis of the coiled wire spring, although other dispositions of the wire are possible.

Figure 5:
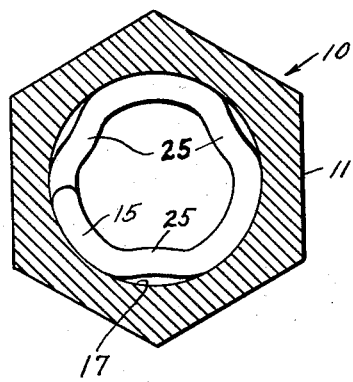
Fig. 5 is an enlarged cross section of the nut with the locking spring.

Referring to Fig. 5, the several convolutions of the spirally coiled wire each have a plurality of lateral deformations, waves, or bends 25, there being preferably three or four of these waves in each convolution. For a one-half inch nut, the amplitude or maximum deflection of a wave from the normal spiral shape of the wire (measured on a line perpendicular to the axis of the spiral) may amount to .005 in. where the overall diameter of the coil of wire is approximately .6045 in. The crests of the waves preferably extend inwardly of the root diameter of the threads of any bolt or stud for which the lock nut is designed. The waves in the several convolutions preferably occur at the same angular positions, although if preferred the waves may be disaligned as viewed from the end of the spring. The purpose of these waves is to provide a locking grip on the bolt or stud, the locking grip arising from the fact that the conventional bolt threads straighten out or "flatten" the waves when the nut is threaded on the bolt. By the expressions "straighten out" or "flatten" I mean that the waves or deformations are made to assume the form of segments of the helix into which wire 15 is coiled. As there are at least six and preferably eight convolutions of wire in each nut, and as each convolution has at least three and preferably four waves or deformations, there will be at least eighteen and preferably thirty-two areas on the inside of the nut where the resilient waves are straightened out by assembling the nut on a stud. The reaction of the spring wire so straightened on the bolt threads effects a secure gripping of the threads. As the waves are formed in permanently resilient wire, any straightening of the waves is only temporary, and as soon as the nut is removed from the bolt, the waves resume their original form. The deformations or waves are easily formed in the wire as it is coiled.

When the described nut is threaded on a nut or stud, there will be a slight spiral shifting or helical creeping of the coiled wire, this shifting taking place in the direction of flange 16 when the nut is being screwed on and in the direction of abutment 14 when the nut is being unscrewed. It has been found that this slight movement of the coiled wire is indispensable to the proper functioning of the nut, because the increase in the length of the coiled wire as the waves flatten or straighten out must be accommodated. It will be understood, however, that the wire coil is securely locked against turning or rotation within the casing 10 by its engagement with the end abutments or flanges 14, 16.

It has been proposed in Patent No. 1,228,671 to E. R. Hibbard, dated June 5, 1917, to provide a nut lock in the form of a washer whose central aperture is provided with a radial slot and a single thread having waves or deformations at several points, these waves being flattened (i. e., made to assume the form of segments of a helix) when the nut is tightened on a bolt. However, the thread is integral with the relatively rigid washer body and hence is anchored throughout its length, therefore cannot creep helically, and lateral flexing of the waved or deformed portions is necessarily resisted by the body of the washer and can only take place to a very limited extent along the inner (unanchored) edge of the single thread.

In accordance with the invention, I provide a lock nut which distributes the locking action over almost the entire length of a nut having several convolutions of thread. The starting torque is low and once the nut is fully on the bolt the torque remains constant, which is believed to be a unique characteristic of nuts embodying the invention. With my lock nut, the locking torque is effective without the necessity of having the bolt project one and one-half or two full threads through the nut, as required of other nuts. As the torque is constant, the user can be sure the nut is in proper condition to lock. There is no variation in torque from 150 in. lb. down to 10 in. lb. in fifteen removals as with other lock nuts which wear out rapidly in use. Less injuries to personnel are likely due to the constant torque feature. If desired, however, the torque can be varied (in different nuts) by varying the deformation of the wire as it is coiled. Furthermore, it is contemplated that the wave at the bolt-receiving end of the nut may be of zero amplitude, so that the nut starts on the bolt with almost no torque. If desired, the wave amplitudes may increase uniformly from zero at the bolt-receiving end to a maximum at the other end, which would give rise to maximum torque at the end of the nut-assembling operation.

The invention is advantageous because the nut may be of an inexpensive steel casing (which is easily spun) enclosing a beryllium copper or phosphor bronze or stainless steel or other corrosion-resisting wire, where the high expense of a solid stainless steel nut is unwarranted. High strength music wire suitable for use in the nuts may be purchased for twenty cents a pound and from one pound of wire the threads for 60–70 one-half inch nuts may be made. It is far easier to coil wire and insert it in the nut bodies than to cut threads in certain metals; such metals may therefore be used for the forming of the wire insert. Inserts of stainless steel should cost less than one cent per nut of the one-half inch size. Instead of metal, certain plastics formed from resins may be used to form the body of the nut where the load on the nut is light, the operating temperature is low and the saving in weight or cost is important. Another advantage is that the end of the wire will not engage with the bolt unless it enters a complete opening in the bolt thread, whereas the tapered end of the thread of an ordinary nut may cross the tapered end of a bolt to cause permanent injury to both parts. As the spring locking action is effective over thirty-two areas (in the preferred form), there is no danger of the spring wire being stressed at any point near to its elastic limit. Because drawn wire is used for the thread on the nut, the thread is much smoother than if it were cut. The close fit between the walls of the casing and the spring insures a strong grip by the spring on the casing when loads are applied, due to the radial component of force provided by the 30° angles on the thread faces. This radial component tends to expand the coil in the casing, thus causing the casing walls to take a considerable portion of the tension load on the nut. Whatever load is thus carried by the casing walls will not be carried by the base, which is obviously advantageous.

Tests indicate that a nut embodying the invention may be screwed on and removed from a bolt more than 100 times without material loss in locking efficiency. Use of nuts will therefore effect great savings in production and in stocked parts (inventory) and will greatly reduce maintenance of all sorts of equipment and machinery. The invention has all the advantageous features mentioned above, and others, as will be understood by those skilled in the art.

This application is a continuation in part of pending application Serial No. 522,081 filed February 12, 1944.

What I claim is:

1. A lock nut comprising, in combination, a hollow casing having inwardly extending shoulders at the top and bottom; and a spring wire closely coiled into a spiral and inserted in the hollow casing and capable of bearing against either shoulder and being so fitted in the casing that it may have a slight helical creep but being held non-rotatable, and having an internal shape forming a thread to be threaded on a bolt or stud; each convolution of the spring having at least one deformation which is wave-like; the amplitude of each wave-like deformation being measurable in a direction substantially at right angles to the longitudinal axis of the spiral spring and the nut being removable from the bolt or stud in the conventional manner.

2. A lock nut comprising, in combination, a hollow casing having inwardly extending shoulders at the top and bottom; and a spring wire closely coiled into a spiral and inserted in the hollow casing and shaped to form a thread, said coiled spring wire being in contact with the inner walls of the casing and also in contact with either of said shoulders, and being immovably held except for a slight helical creep which is permitted when the nut is threaded on a bolt or stud; each convolution of the coiled spring wire having at least one wave-like deformation; the crests of said wave-like deformations extending inwardly of the root diameter of the threads of any bolt or stud for which the nut is designed, when the nut is off the bolt or stud, said wave-like deformations yielding as the nut is threaded on a bolt or stud and assuming the form of sections of the spiral formed by said spring wire, the locknut being removable from the bolt or stud in the conventional manner.

3. A locknut comprising, in combination, a hollow casing having inwardly extending shoulders at the top and bottom, at least one of these shoulders having a helical surface provided with a stop thereon; and a spring wire closely coiled into a spiral and inserted in the hollow casing and being shaped on the inward part so as to form substantially a standard thread, said coiled spring wire being in contact with the inner walls of the casing and also in contact with either of said shoulders, and being immovably held thereby except for a slight helical creep which is permitted when the nut is threaded on a bolt or stud; each convolution of the coiled spring wire having at least one wave-like deformation; the crests of said wave-like deformations extending inwardly of the root diameter of the threads of any bolt or stud for which the nut is designed, when the nut is off the bolt or stud; said wave-like deformations yielding as the nut is threaded on a bolt or stud and assuming the form of sections of the spiral formed by said spring wire, the locknut being removable from the bolt or stud in the conventional manner.

MARK HATTAN.